2 Sheets—Sheet 1.
C. COLE.
SWITCH FOR BUTCHERS' TRACKS.
No. 9,900.
Reissued Oct. 18, 1881.
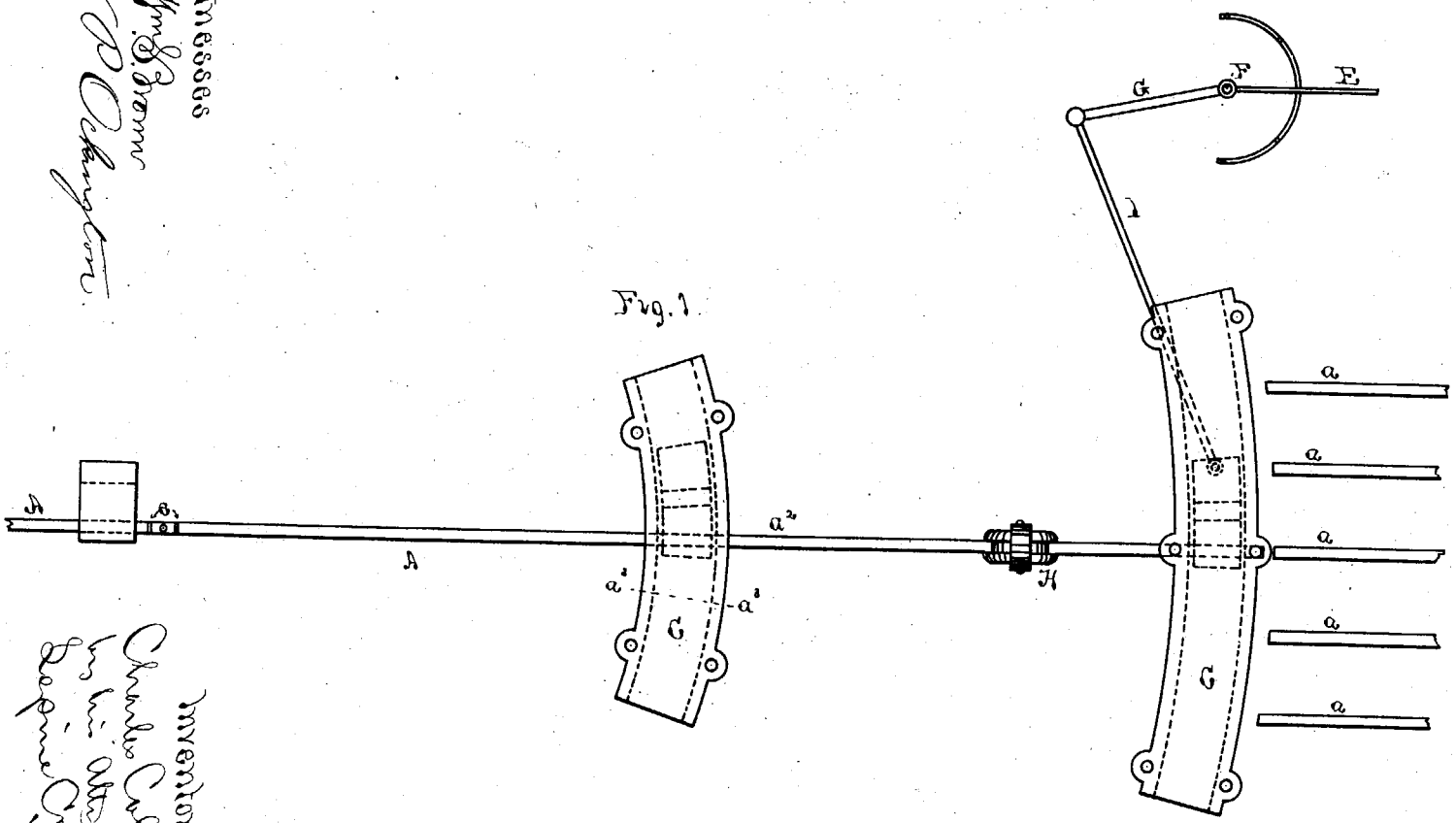
Witnesses
Wm. S. Brown
N. P. Ockington.
Inventor
Charles Cole
by his Attys
Lepine & Rice
N. PETERS, Photo-Lithographer, Washington, D. C.

2 Sheets—Sheet 2.
C. COLE.
SWITCH FOR BUTCHERS' TRACKS.
No. 9,900.
Reissued Oct. 18, 1881.
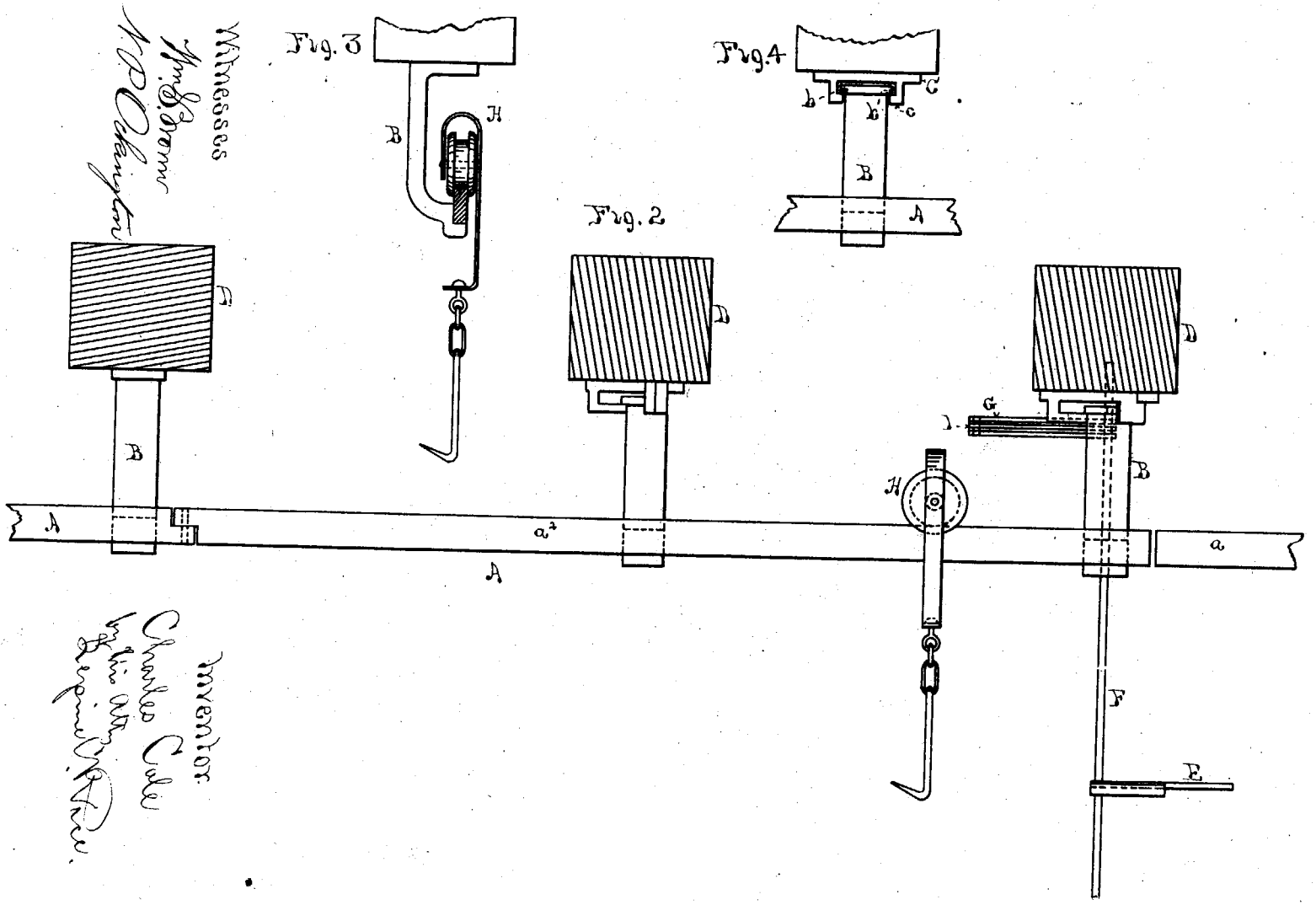
Witnesses
Wm. S. Brown
N. P. Ockington
Inventor.
Charles Cole
by his Atty
Lepine V. Pace.
N. PETERS, Photo-Lithographer, Washington, D. C.

UNITED STATES PATENT OFFICE.

CHARLES COLE, OF WEST NEWTON, MASSACHUSETTS.

SWITCH FOR BUTCHERS' TRACKS.

SPECIFICATION forming part of Reissued Letters Patent No. 9,900, dated October 18, 1881.

Original No. 242,754, dated June 14, 1881. Application for reissue filed September 14, 1881.

*To all whom it may concern:*

Be it known that I, CHARLES COLE, of West Newton, in the county of Middlesex and State of Massachusetts, have invented a new and useful Improvement in Switches for Butchers' Tracks, of which the following is a specification.

My invention relates to an overhead track on which run trucks provided with hooks, upon which heavy articles can be suspended beneath the track and readily moved from place to place; and its objects are to provide a convenient way to connect the main track with the branches, which extend to different parts of the room or inclosure, and to provide a convenient method of shifting such connecting main track from connection with one branch to connection with another. I attain these objects by the mechanism illustrated in the accompanying drawings, in which—

Figure 1 is a plan view of my device, taken on the level of the bottom of the timbers upon which it is attached. Fig. 2 is a side elevation of the device in operative position. Fig. 3 is an end view of the main track, with the truck that travels upon it in position. Fig. 4 is a section on line $a^3$ $a^3$ of Fig. 1, showing how the hanger is retained in the arc in which it moves.

A is the main track. *a a* are the branches. $a^2$ is the last rail of the main track.

B B are the hangers, which support the track at a short distance from the ceiling.

C C are arc-plates, attached to the ceiling or overhead beams D D. In the channels in these plates the upper ends of the hangers slide, being retained therein by the flanges *b b* on the upper end of the hangers, under which the lips *c c* extend. The top end of the hanger consists of an arc-shaped piece of considerable length, extending transversely to the line of the rail which the hanger supports, provided with the flanges above mentioned upon its sides, which enables the hanger to slide in ways formed in the arc-plate freely without binding or catching during its movement.

H is one of the trucks commonly used on this kind of track. It consists of a wheel grooved to fit the track, provided with an arm ∩-shaped at its upper extremity to afford support to the axis upon both sides of the wheel, which is placed in such curved part. To the lower end of the arm is attached a hook, upon or to which the article to be transported is attached, being elevated above the floor, when by pushing against such article the truck will be moved in the direction desired. As both the truck and single-rail track are old and well known, no extended description of them is necessary. Heretofore, however, the track has been sustained in its position near the ceiling by hangers like the left-hand one in Figs. 1 and 2 and the one in Fig. 3, which were rigidly attached to the overhead timbers, and it was shifted into connection with the branch tracks by shifting the end of the last rail of the main track, which was not fastened to the hangers, but had its ends cut half away, so as to fall into recesses made in hangers alongside of the ends of the branch rail with which it was put into connection and the last preceding rail of the main line, the ends of which were also cut away half their breadth to form a splice with the shifting-rail, (a hanger being placed at each point of connection.) The last rail, not being fastened, was moved into connection with the desired branch track, by lifting its end nearest the branch-track out of the recess in the hanger sustaining the end of such branch track and removing it to the track desired, and placing it in the recess in the hanger supporting the end of that track. The track being overhead and beyond the reach of a person standing on the floor rendered it a work of some difficulty, and, as it was generally undertaken by the use of pike-holes, was somewhat hazardous, on account of the liability of the loose end of the rail to fall. If, however, to avoid such hazard, a ladder or other means of reaching the rail with the hands was undertaken, it was at the loss of considerable time, which occurred at such period, generally, as was least desirable, because such changes have to be made at the time when the largest number of persons are employed, and must be delayed until the change is effected. It also sometimes happened that the rail became detached at its other end when lifted by the pike-poles, and fell upon the floor or the persons beneath. It is for the purpose of obviating such delays and dangers that I have provided the mechanism herein described.

The rail $a^2$ being attached to the last preceding one of the main track, with a hinged joint at *e*, is sustained by the sliding hangers at its middle and near its end. These hangers, as before stated, slide in the arc-plates C, and the end of the main line can be thus brought adjacent and opposite to any one of the branch tracks without lifting the connecting-rail. The movement of the hangers in the ways formed in the arc-plates can be effected by the operator's moving the lever E horizontally. This will oscillate the perpendicular rock-shaft F, which has attached, at a point about on a level with the arc-plates, the arm G, which, by means of a rod, I, is connected to the top of the hangers.

*f* is a notched arc, to indicate to the operator when the movement of the lever has brought the track into connection with each branch, and to hold the lever in such position, when left, in the same manner as a similar device used upon railroads, which is well known.

Any other system of levers can be used, if desired, to slide the track to bring the main line into connection with either branch; or the sliding hangers can be moved by a bar extending to the operator direct, and removed sufficiently, when not in use, to be out of the way of the passing of the trucks along the rail.

It is obvious that the several parts need not be made and arranged precisely as shown in the drawings, as the suspension of the swinging rail by an arc-shaped piece at its non-pivoted end, which permits the end of the rail to be slid into opposition with either of a number of branch tracks, is the substance of my invention, and such modifications in construction as will readily suggest themselves to a mechanic which use the material elements of my device, will be no departure from the spirit of my invention.

It is also obvious that the arc-plates, instead of being channeled and the hangers flanged, may be made and operated upon the same principles by having the arc-plate flanged and the hanger enclasping it, it being only necessary that the arc-plate and hanger be arranged and connected together in a sliding or other analogous way, whereby one of said parts is enabled to move upon the other.

What I claim as new and of my invention is—

1. In a single suspended-track railway, the combination of the rail $a^2$, pivoted at point *e* at one end, and supported by a hanger and arc-piece at its other end, with the rails *a a*, all substantially radial to the point *e*, and all having their ends an equal distance from that point, substantially as described.

2. The combination of the rail $a^2$, hanger B, and arc-plate C, substantially as described.

3. The combination of the rail $a^2$, hanger B, and arc C, the oscillating shaft F, provided with the arm G, lever E, and connecting-rod I, substantially as described.

4. In a single suspended-track railway, the combination of a rail pivoted to the main line at one end and supported by an arc-piece and hanger at its other, with several branch tracks whose ends are on the same plane as the pivoted rail and at substantially the same distance from its pivot, substantially as described.

CHARLES COLE.

Witnesses:
LEPINE C. RICE,
N. P. OCKINGTON.